(12) United States Patent
Hasegawa et al.

(10) Patent No.: US 6,340,993 B1
(45) Date of Patent: Jan. 22, 2002

(54) AUTOMATIC CLOCK PHASE ADJUSTING DEVICE AND PICTURE DISPLAY EMPLOYING THE SAME

(75) Inventors: Ryo Hasegawa, Kamakura; Takaaki Matono, Yokohama; Takeshi Sakai, Minami-ku; Ryuichi Someya, Fujisawa, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/399,223

(22) Filed: Sep. 20, 1999

(30) Foreign Application Priority Data

Oct. 20, 1998 (JP) .......................................... 10-298330

(51) Int. Cl.⁷ ............................................... H03M 1/12
(52) U.S. Cl. ...................................... 348/572; 348/678
(58) Field of Search ............................... 348/572, 678, 348/573, 180; 341/155–165

(56) References Cited

U.S. PATENT DOCUMENTS

| | | | | |
|---|---|---|---|---|
| 4,130,835 A | * | 12/1978 | Guildford | 358/160 |
| 4,647,968 A | * | 3/1987 | Willis | 358/141 |
| 4,704,632 A | * | 11/1987 | Van den Heuvel | 358/209 |
| 5,657,089 A | * | 8/1997 | Onagawa | 348/572 |
| 5,717,469 A | * | 2/1998 | Jennes et al. | 348/571 |
| 5,764,299 A | * | 6/1998 | Jennes et al. | 348/500 |
| 5,936,678 A | * | 8/1999 | Hirashima | 348/537 |
| 6,002,445 A | * | 12/1999 | Urayama | 348/572 |
| 6,057,891 A | * | 5/2000 | Guerin et al. | 348/572 |
| 6,097,444 A | * | 8/2000 | Nakano | 348/607 |
| 6,166,775 A | * | 12/2000 | Fukuda | 348/572 |

FOREIGN PATENT DOCUMENTS

JP          1063234        3/1998

* cited by examiner

Primary Examiner—Victor R. Kostak
(74) Attorney, Agent, or Firm—Antonelli, Terry, Stout & Kraus, LLP

(57) ABSTRACT

An automatic clock phase adjusting device is employed principally in a picture display to adjust automatically the phase of a clock signal given to an A/D converter which converts an analog image signal into a corresponding digital image signal. The automatic clock phase adjusting device comprises a delay circuit that delays the phase of the clock signal; an image level detecting circuit that detects the image level of a horizontal image starting portion of the digital image signal and the image level of an image terminating portion of the digital image signal; and a control circuit that controls a delay by which the delay circuit delays the clock signal on the basis of the output signal of the image level detecting circuit. The control circuit controls the phase delay by which the delay circuit delays the clock signal, combines the image level of the horizontal image starting portion of the digital image signal, and the image level of the horizontal image terminating portion of the digital image signal to obtain a combined image level on the basis of the output signal of the image level detecting circuit, and selects an optimum phase of the clock signal in which the combined image level is maximum to determine the phase delay.

21 Claims, 8 Drawing Sheets

AUTOMATIC CLOCK PHASE ADJUSTING DEVICE AND PICTURE DISPLAY EMPLOYING THE SAME

BACKGROUND OF THE INVENTION

The present invention relates to a circuit technology for converting an analog image signal provided by a personal computer or the like into a corresponding digital image signal and displaying a picture represented by the digital image signal on a fixed- pixel display device, such as a liquid crystal panel. More specifically, the present invention relates to a circuit technology for automatically carrying out automatic clock phase adjustment when converting an analog image signal into a corresponding digital image signal.

A liquid crystal display requiring less space and less power has become an attractive picture display for personal computers in recent years. Generally, the liquid crystal display converts an analog image signal provided by a personal computer into a corresponding digital image signal, subjects the digital image signal to image processing process, such as an image expansion process, an image compression process or the like, and displays a picture represented by the digital image signal.

FIG. 5 shows an A/D converter 505 for converting an analog image signal 501 into a corresponding digital image signal, and the waveforms of the analog image signal and clock signals. As *shown in FIG. 5, the analog image signal 501 is converted into a corresponding digital image signal by the A/D converter 505 in synchronism with the clock signal.

The A/D conversion of the analog image signal 501 is carried out in synchronism with the clock signal 502 of a phase 1 and the clock signal 503 of a phase 2.

When the A/D conversion of the analog image signal 501 is executed in synchronism with the clock signal 502 of the phase 1 and the clock signal 503 of the phase 2, the digital image signal provided by the A/D converter 505 is very unstable because the pulses of the clock signals 502 and 503 correspond to a leading edge and a trailing edge of the analog image signal 501, respectively. A picture represented by thus produced digital image signal seems to have noise. The phase of the clock signal must be adjusted as the phase 3 of a clock signal 504 to use a stable portion of the analog image signal for A/D conversion.

The adjustment of a clock signal requires the operator to operate keys, watching a picture displayed on the liquid crystal display. However, work for adjusting the phase of the clock signal while visually observing the variation of the picture is very difficult. A method of automatically adjusting the phase of a clock signal for timing an A/D conversion operation has been developed to avoid such difficult work. An automatic clock phase adjusting function is essential to a liquid crystal display.

An automatic clock phase adjusting method is disclosed in JP-A No. Hei 10-63234. A prior art technology associated with this prior art automatic clock phase adjusting method will be described hereinafter.

FIG. 6 shows a prior art liquid crystal display. A personal computer applies an analog image signal, a horizontal synchronizing signal and a vertical synchronizing signal respectively to an image signal input terminal 101, a horizontal synchronizing signal input terminal 111 and a vertical synchronizing signal input terminal 112.

The analog image signal is given to an A/D converter 102. The A/D converter 102 converts the analog image signal into a corresponding digital image signal in synchronism with a clock signal generated by a clock generating circuit 106. The digital image signal provided by the A/D converter 102 is given to an image processing circuit 103 and an image edge detecting circuit 108.

The image processing circuit 103 processes the input digital image signal for expansion or compression. The digital image signal processed by the image processing circuit 103 is transferred through a liquid crystal driving circuit 104 to a liquid crystal panel 105 to display a picture represented by the digital image signal.

The horizontal synchronizing signal applied to the horizontal synchronizing signal input terminal 111 is given to a delay circuit 110. The delay circuit 110 delays the horizontal synchronizing signal by a delay determined by a control circuit 107. The delayed horizontal synchronizing signal provided by the delay circuit 110 is given to the clock generating circuit 106 and the image edge detecting circuit 108.

The clock generating circuit 106 divides the frequency of the horizontal synchronizing signal by a value determined by the control circuit 107 to generate a clock signal. Thus the clock phase is controlled by the delay of the horizontal synchronizing signal. The clock signal generated by the clock generating circuit 106 is given to the A/D converter 102, the image processing circuit 103 and the image edge detecting circuit 108. The vertical synchronizing signal applied to the vertical synchronizing signal input terminal 112 is given to the image processing circuit 103 and the image edge detecting circuit 108. The control circuit 107 controls the general operations of the liquid crystal display and a principal component of the control circuit is a microcomputer.

The image edge detecting circuit 108 detects the horizontal image starting coordinates and horizontal image terminating coordinates of the digital image signal by using an image level determined by the control circuit 107 as a threshold. The horizontal direction can be detected in a unit of clock on the basis of the horizontal synchronizing signal. The vertical direction can be detected in a unit of line on the basis of the vertical synchronizing signal. The term "coordinates' used herein signifies a pixel at an edge with respect to a horizontal direction, and a line including the pixel.

A conventional automatic clock phase adjusting operation will be described hereinafter with reference to FIG. 7 showing a conventional clock phase adjusting procedure on an assumption that the clock dividing ratio conforms to the input image signal, i.e., the clock generating circuit 106 provides a clock signal generated by dividing the horizontal synchronizing signal by the total number of horizontal pixels, before the automatic clock phase adjustment is executed.

In step 701, the control circuit 107 determines a minimum delay for the delay circuit 110. In step 702, the control circuit 107 reads data on a horizontal image starting position from the image edge detecting circuit 108 and stores the same in an internal memory. In step 703, the control circuit 107 increases the delay for the delay circuit 110 and delays the clock phase. In step 704, the control circuit 107 reads data on a horizontal image starting position from the image edge detecting circuit 108. In step 705, query is made to see if the horizontal image starting position read in step 704 is different from that read in step 702. If the response in step 705 is affirmative, the control circuit 107 sets a delay equal to half a delay at time corresponding to step 706 as an adjusted value for the delay circuit 110. If the response in step 705 is negative, the program returns to step 703.

FIG. 8 is a waveform diagram showing the waveforms of an analog image signal and a clock signal.

Suppose that a clock phase at time corresponding to step 701 is a clock phase 802 for analog image signal 801. In step 702, a horizontal image starting position n is detected. When steps 703 and 704 are repeated, the clock phase is delayed to a clock phase 803 and then to a clock phase 804. In a state with the clock phase 804, a horizontal image starting position detected in step 704 is n−1. In step 705 it is decided that the horizontal image starting position changed from n to n−1, and the clock phase 804 is set at a position around the center of a pixel in step 706.

SUMMARY OF THE INVENTION

This conventional automatic clock phase adjusting method, however, is effective only with an analog image signal in which a central portion of each pixel is always stable and is unable to achieve automatic clock phase adjustment satisfactorily when an analog image signal has a waveform as shown in FIG. 9. An analog image signal 901 shown in FIG. 9 has a dull waveform and a central portion of a pixel corresponds to a leading edge. Consequently, an unstable digital signal is provided when the analog image signal is subjected to A/D conversion with the clock phase coincided with a central portion of a pixel as a clock phase 902. Therefore, the clock phase needs to be adjusted as a clock phase 903. It is highly possible that an analog image signal having a dull waveform like the analog image signal 901 is given to the liquid crystal display due to the influence of a cable connecting the personal computer to the liquid crystal display or the like. When such an analog image signal having a dull waveform is given to the liquid crystal display, the conventional automatic clock phase adjusting method is unable to adjust clock phase and, consequently, the operator needs to adjust clock phase manually. Thus the conventional automatic clock phase adjusting method is effective only with analog image signals in which a central portion of each pixel is stable.

Accordingly, it is an object of the present invention to provide an automatic clock phase adjusting device capable of automatically achieving optimum clock phase adjustment in conformity to the waveform of an analog image signal.

According to one aspect of the present invention, an automatic clock phase adjusting device comprises: an A/D converter that receives an analog image signal and a clock signal, and converts the analog image signal into a corresponding digital image signal in synchronism with the clock signal; a delay circuit that receives a horizontal synchronizing signal synchronous with the analog image signal and provides the horizontal synchronizing signal after delaying the horizontal synchronizing signal by an optionally determined delay; a clock generating circuit that receives the horizontal synchronizing signal from the delay circuit, divides the frequency of the delayed horizontal synchronizing signal to generate the clock signal; an image edge detecting circuit that receives the digital image signal provided by the A/D converter, the horizontal synchronizing signal provided by the delay circuit, the clock signal provided by the clock generating circuit, and a vertical synchronizing signal synchronous with the analog image signal, and detects a horizontal image starting coordinates and horizontal image terminating coordinates; an image level detecting circuit that receives signals the same as those received by the image edge detecting circuit, and detects a digital image signal indicating specified coordinates; and a control circuit that carries out a first control operation for sequentially delaying the phase of the clock signal generated by the clock generating circuit by changing the delay given to the delay circuit from a minimum value to a value exceeding one period of the clock signal in an optional step, a second control operation for obtaining digital signal values at the horizontal image starting coordinates and the horizontal image terminating coordinates detected by the image edge detecting circuit by the image level detecting circuit in each clock phase specified by the first control operation, an arithmetic operation for adding up the digital signal values of the horizontal image starting coordinates and the horizontal image terminating coordinates in each clock phase obtained by the second control operation, a detecting operation for detecting a clock phase corresponding to a maximum added digital signal value among the added digital signal values calculated by the arithmetic operation, and a third control operation for controlling the delay circuit so that the clock signal has a clock phase detected by the detecting operation.

The automatic clock phase adjusting device is capable of automatically achieving an optimum clock phase adjustment in conformity to the waveform of the input analog image signal.

DETAILED DESCRIPTION OF THE PREFERRED EMBODIMENTS

Figure 1:
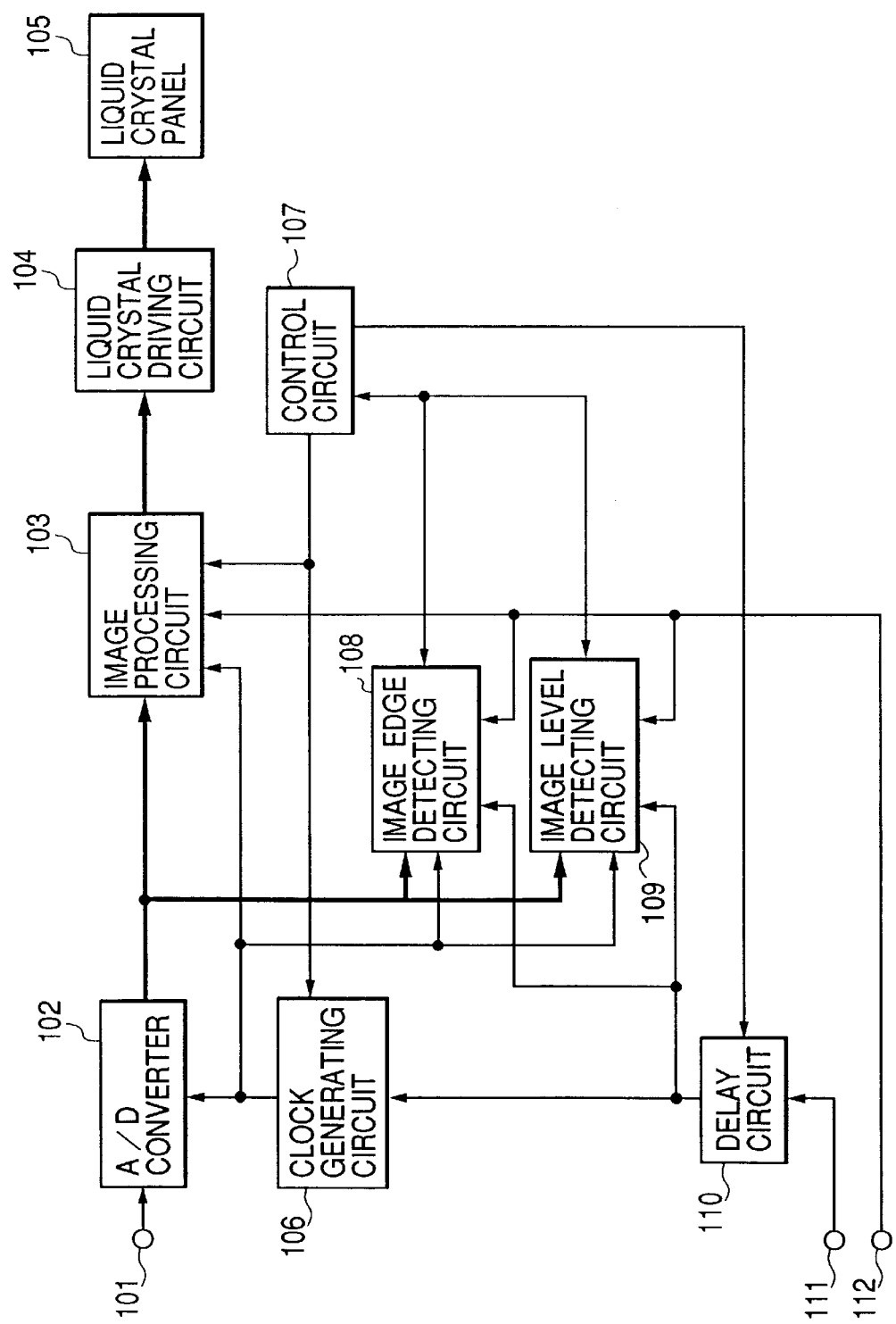
FIG. 1 is a block diagram of a liquid crystal display in a first embodiment according to the present invention.

FIG. 1 shows a liquid crystal display in a first embodiment according to the present invention for displaying pictures represented by analog image signals provided by a personal computer.

Referring to FIG. 1 there are shown an analog image signal input terminal 101, an A/D converter 102, an image processing circuit 103, a liquid crystal driving circuit 104, a liquid crystal panel 105, a clock generating circuit 106, a control circuit 107, an image edge detecting circuit 108, an image level detecting circuit 109, a delay circuit 110, a horizontal synchronizing signal input terminal 111 and a vertical synchronizing signal input terminal 112.

A personal computer applies an analog image signal, a horizontal synchronizing signal and a vertical synchronizing signal respectively to the image signal input terminal 101, the horizontal synchronizing signal input terminal 111 and the vertical synchronizing signal input terminal 112.

The analog image signal is given to the A/D converter 102 from the image signal input terminal 101. The A/D converter 102 converts the analog image signal into a corresponding digital image signal in synchronism with a clock signal generated by the clock generating circuit 106. The digital image signal provided by the A/D converter 102 is given to the image processing circuit 103, the image edge detecting circuit 108 and the image level detecting circuit 109.

The image processing circuit 103 processes the input digital image signal for expansion or compression. The digital image signal processed by the image processing circuit 103 is transferred through the liquid crystal driving circuit 104 to the liquid crystal panel 105 to display a picture represented by the digital image signal.

The horizontal synchronizing signal applied to the horizontal synchronizing signal input terminal 111 is given to the delay circuit 110. The delay circuit 110 delays the horizontal synchronizing signal by a delay determined by the control circuit 107. The delayed horizontal synchronizing signal provided by the delay circuit 110 is given to the clock generating circuit 106, the image edge detecting circuit 108 and the image level detecting circuit 109.

The clock generating circuit 106 divides the frequency of the horizontal synchronizing signal by a value determined by the control circuit 107 to generate a clock signal. Thus the clock phase is controlled by the delay of the horizontal synchronizing signal. The clock signal generated by the clock generating circuit 106 is given to the A/D converter 102, the image processing circuit 103, the image edge detecting circuit 108 and the image level detecting circuit 109. The vertical synchronizing signal applied to the vertical synchronizing signal input terminal 112 is given to the image processing circuit 103, the image edge detecting circuit 108 and the image level detecting circuit 109. The control circuit 107 controls the general operations of the liquid crystal display and a principal component of the control circuit is a microcomputer.

The image edge detecting circuit 108 detects the horizontal image starting coordinates and horizontal image terminating coordinates of the digital image signal by using an image level determined by the control circuit 107 as a threshold. The horizontal direction can be detected in a unit of clock on the basis of the horizontal synchronizing signal. The vertical direction can be detected in a unit of line on the basis of the vertical synchronizing signal. The term "coordinates' used herein signifies a pixel at an edge with respect to a horizontal direction, and a line including the pixel.

Figure 8:
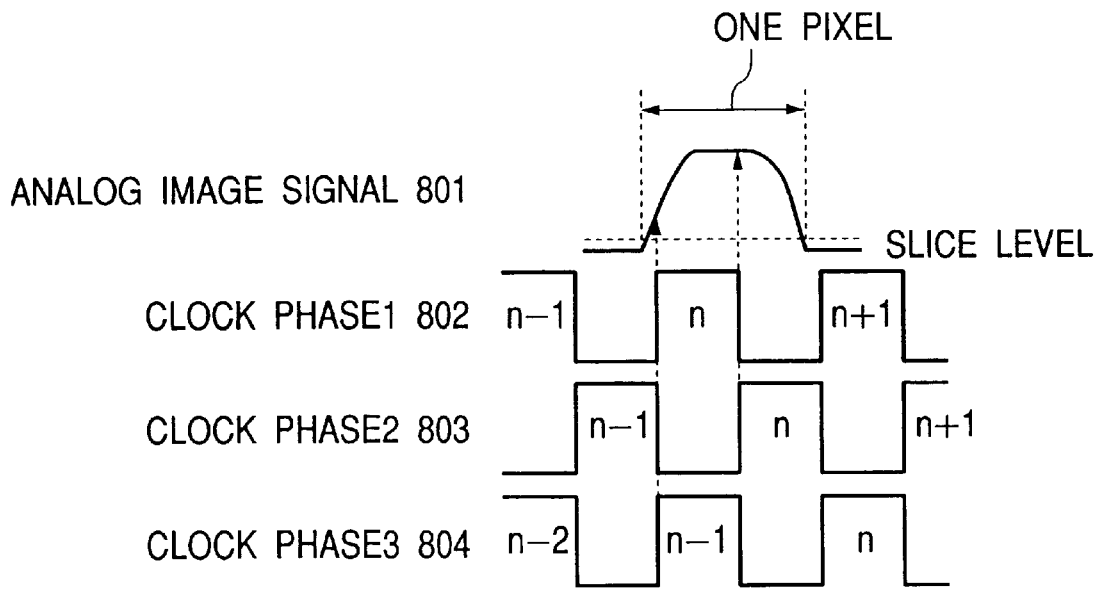
FIG. 8 is a diagram of assistance in explaining a conventional automatic clock phase adjusting method.
Figure 9:
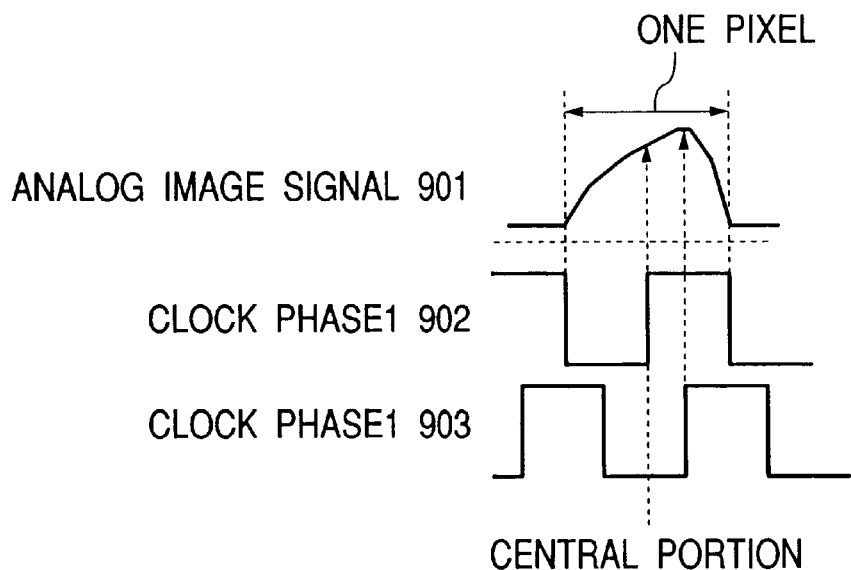
FIG. 9 is a view of assistance in explaining problems in the conventional automatic clock phase adjusting method.

The image level detecting circuit 109 is an additional circuit added to the conventional liquid crystal display shown in FIG. 8 to solve the problems in the conventional liquid crystal display. The image level detecting circuit 109 detects the image level of a pixel specified by the control circuit 107.

Figure 3:
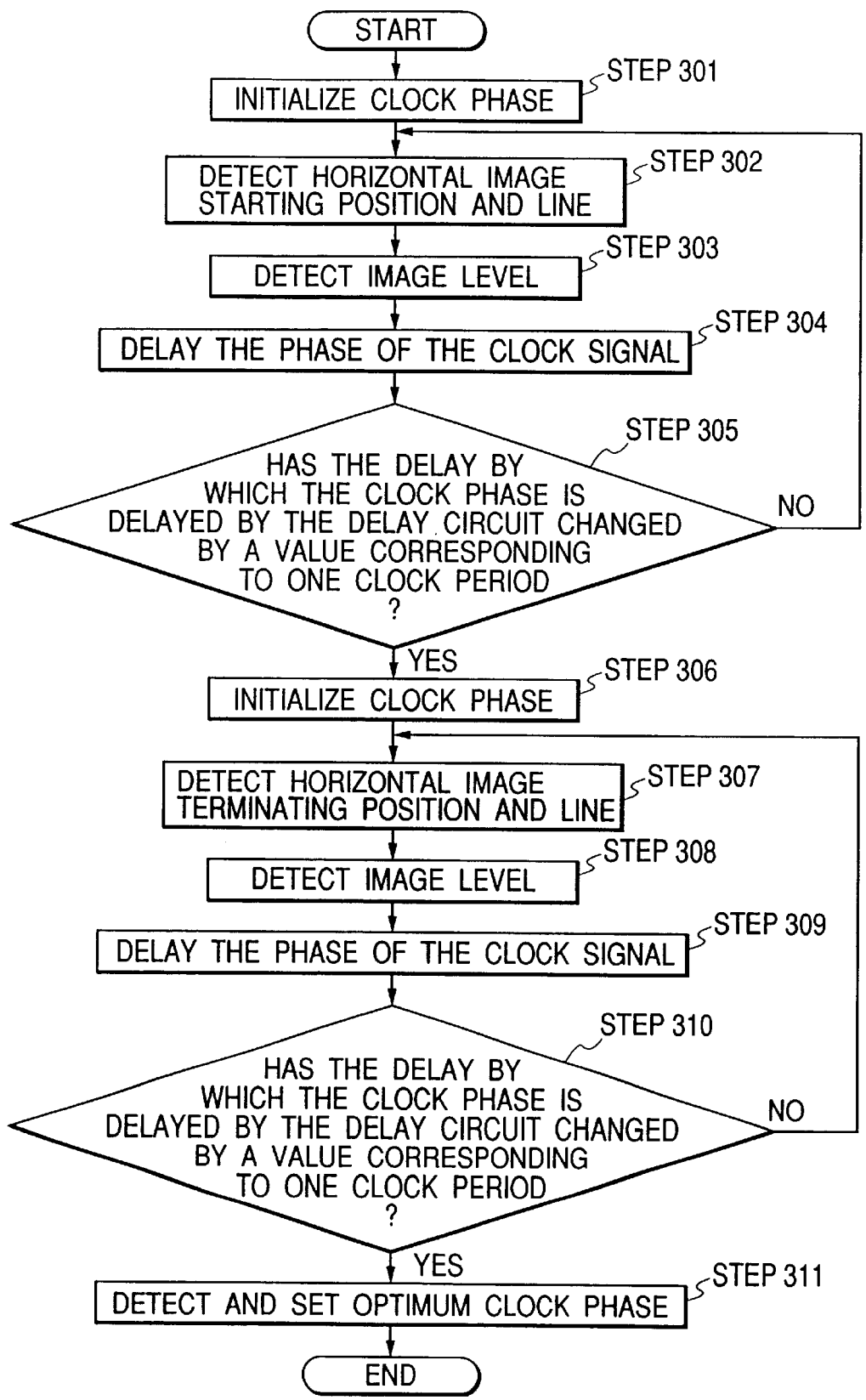
FIG. 3 is a flow chart of an automatic clock phase adjusting procedure in accordance with the present invention.

An automatic clock phase adjusting operation will be described hereinafter with reference to FIG. 3 showing a clock phase adjusting procedure on an assumption that the clock dividing ratio conforms to the input image signal, i.e., the clock generating circuit 106 provides a clock signal generated by dividing the horizontal synchronizing signal by the total number of horizontal pixels, before the automatic clock phase adjustment is executed.

In step 301, the control circuit 107 determines a minimum delay for the delay circuit 110. In step 302, the control circuit 107 reads data on a horizontal image starting position and data on the number of its lines from the image edge detecting circuit 108. In step 303, the control circuit 107 determines an image level at the position detected by the image level detecting circuit 109 and stores the same in its internal memory. In step 304, the control unit 107 increases the delay for the delay circuit 110 and delays the clock phase. In step 305, a query is made to see if the delay by which the clock phase is delayed by the delay circuit 110 has changed by a value corresponding to one clock period. Step 306 is executed if the response in step 305 is affirmative. The clock phase adjusting procedure returns to step 302 if the response in step 305 is negative. Steps 302 to 304 are repeated to store image levels at the horizontal image starting position for clock phases in the memory of the control circuit 107.

In step 306, the control circuit 107 sets the minimum delay again for the delay circuit 110. In step 307, the control circuit 107 receives data on a horizontal image terminating position and the number of its lines from the image edge detecting circuit 108. In step 308, the control circuit 107 receives an image level at the position detected in step 302 from the image level detecting circuit 109 and stores the same in the memory thereof. In step 309, the control circuit 107 increases the delay for the delay circuit 110 to delay the clock phase. In Step 310, a query is made to see if the delay by which the clock phase is delayed by the delay circuit 110 has changed by a value corresponding to one clock period. Step 311 is executed if the response in step 309 is affirmative. The clock phase adjusting procedure returns to step 307 if the response in step 309 is negative. Steps 307 to 309 are repeated to store image levels at the horizontal image terminating position for clock phases in the memory of the control circuit 107.

In step 311, data on combined image levels is produced by adding up the image levels at the horizontal image starting position and those at the horizontal image terminating position of the same clock phases stored in the memory of the control circuit 107. Stable portions are detected from the data on the combined image levels, and the delay circuit 110 is controlled so that the clock signal has the detected clock phase.

Figure 4:
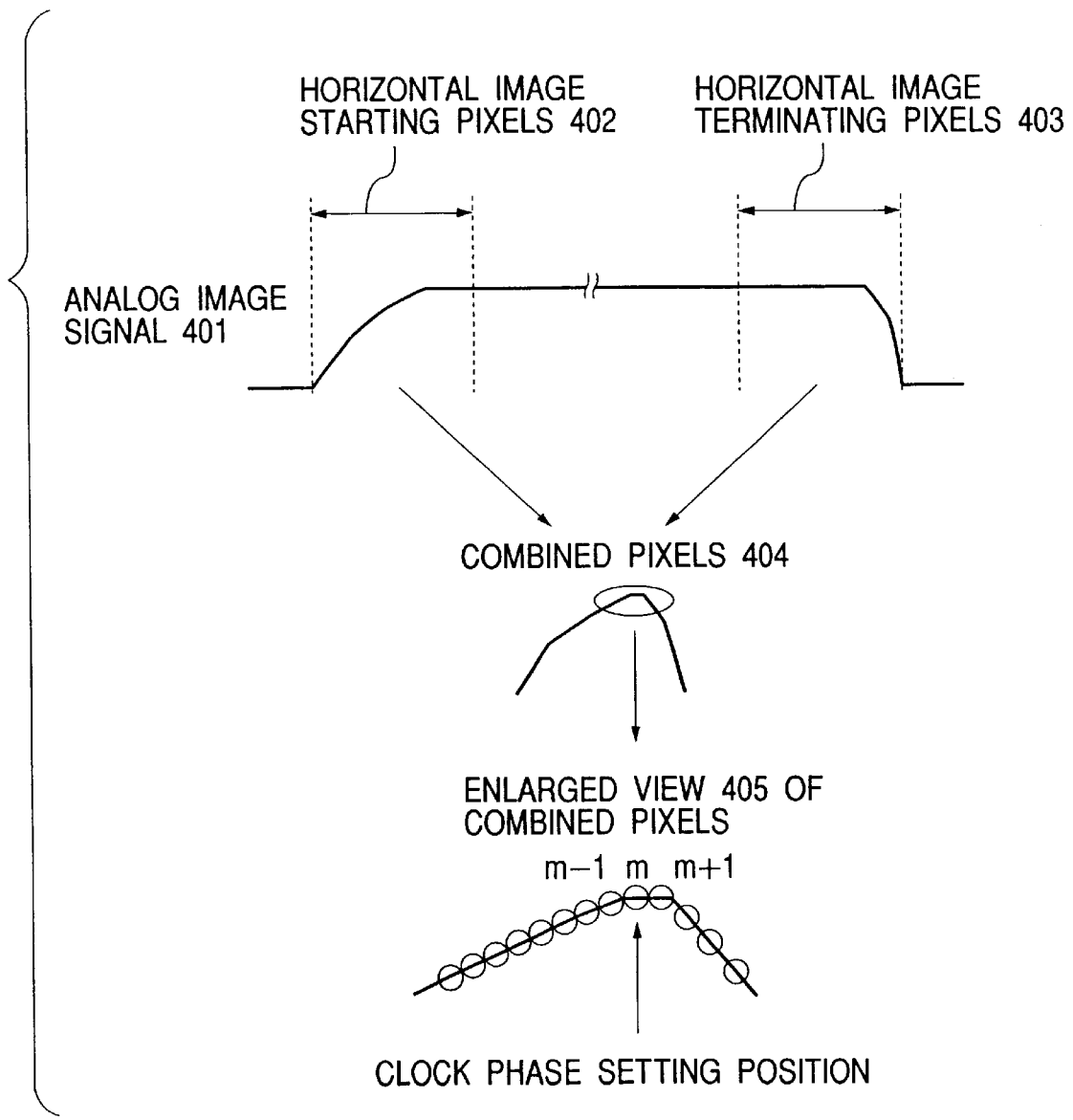
FIG. 4 is a diagram of assistance in explaining an automatic clock phase adjusting method according to the present invention.
Figure 5:
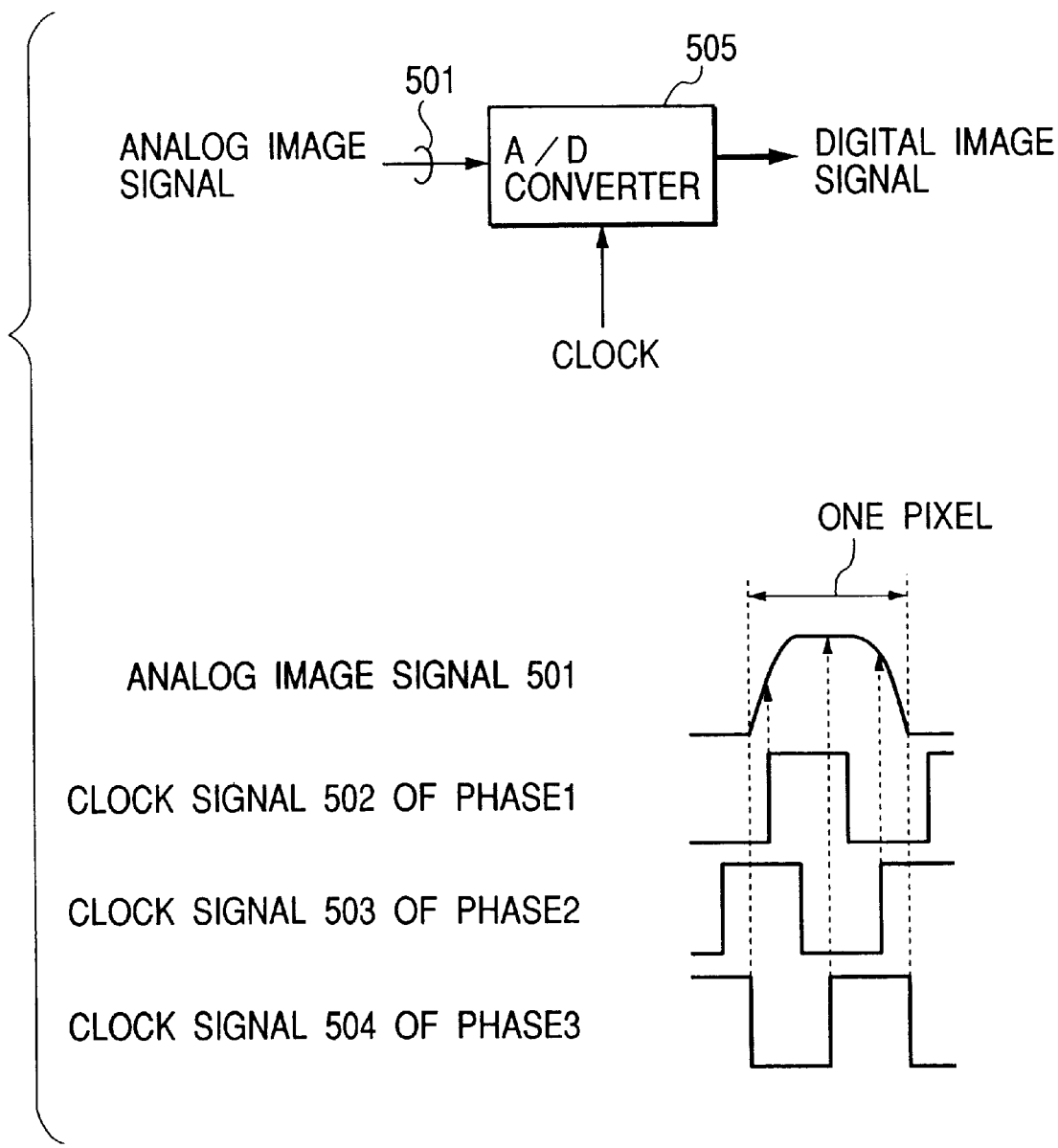
FIG. 5 is a diagram of assistance in explaining a conception on which clock phase adjustment is based.
Figure 6:
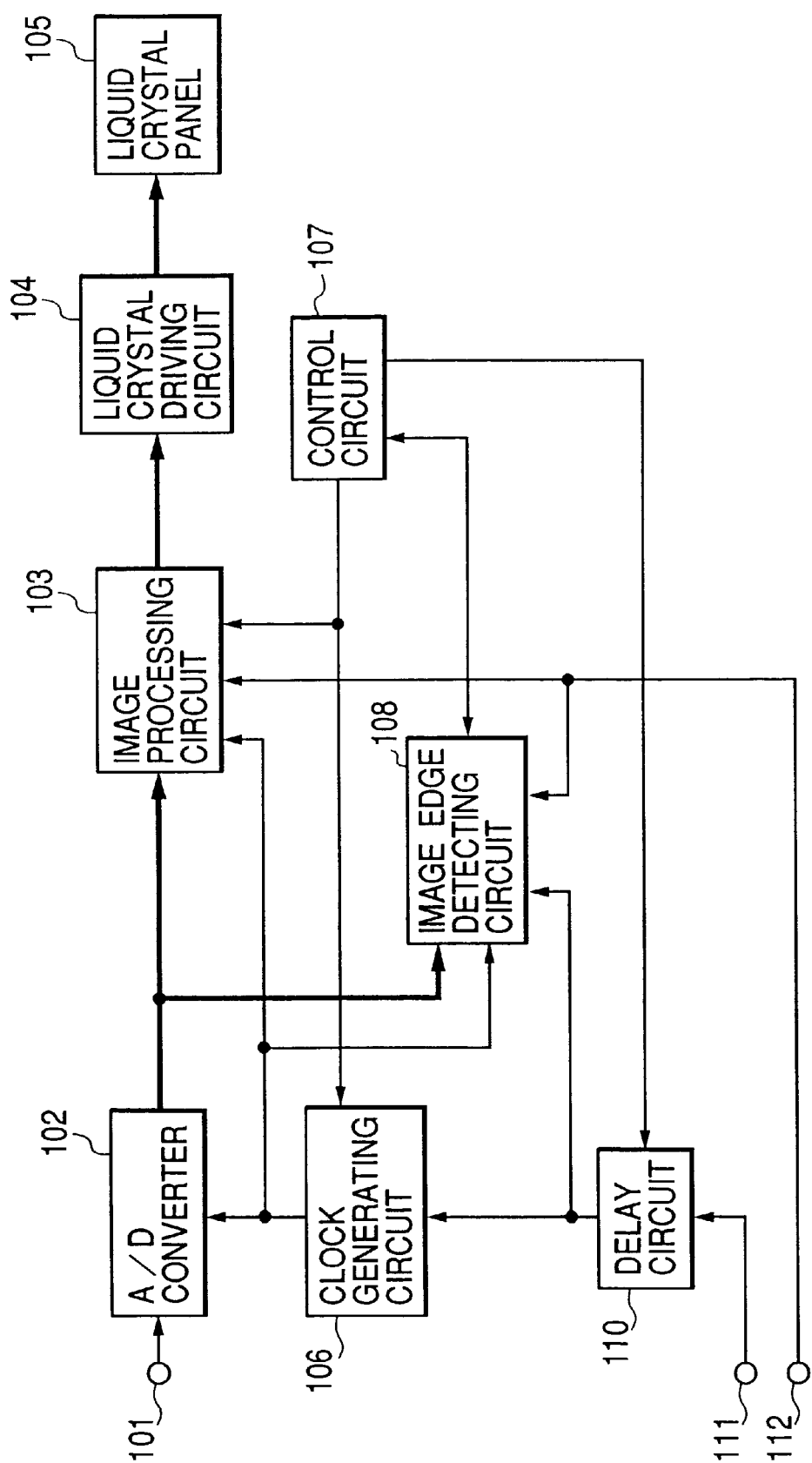
FIG. 6 is a block diagram of a conventional liquid crystal display.
Figure 7:
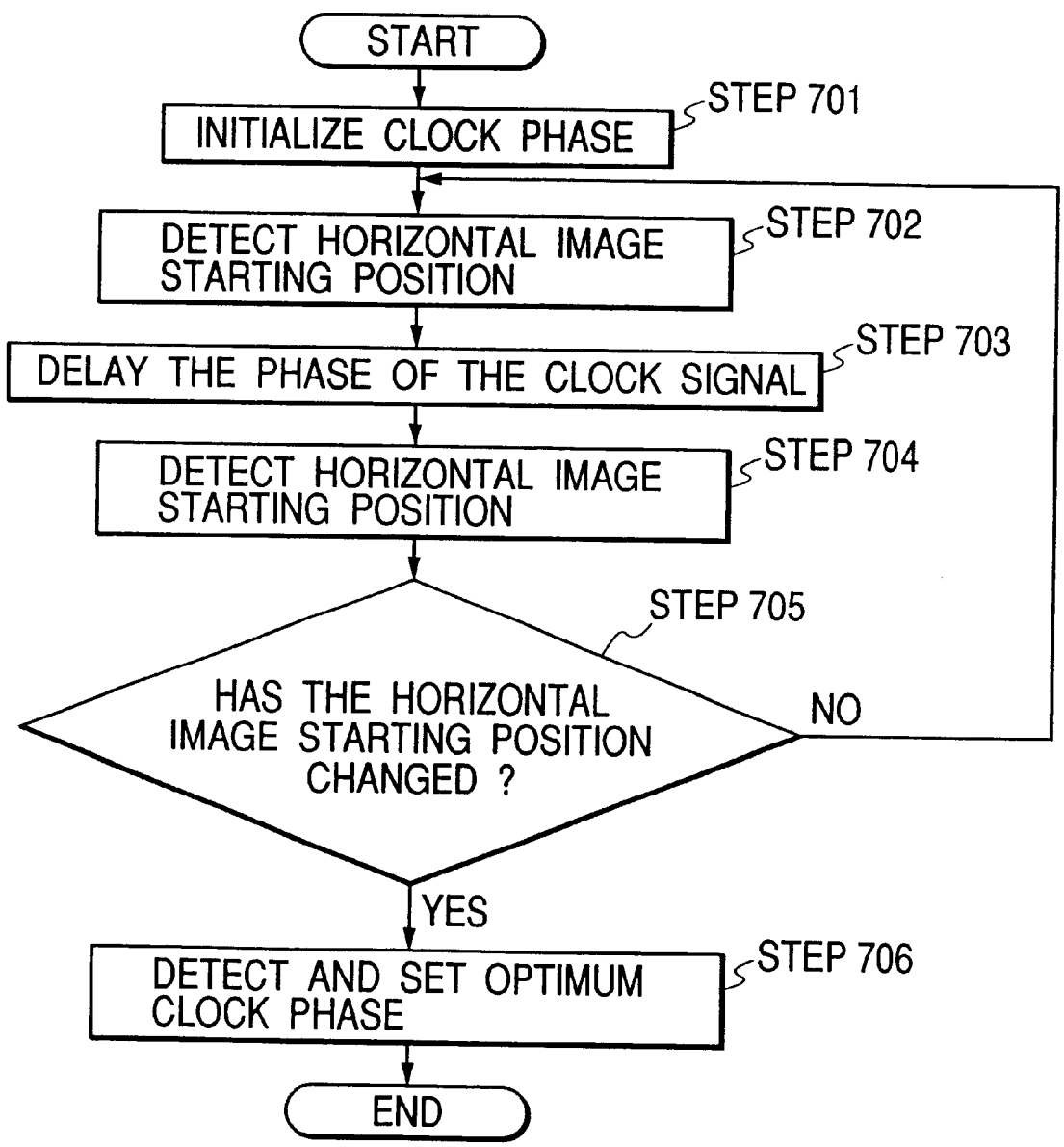
FIG. 7 is a flow chart of a conventional automatic clock phase adjusting procedure.

The clock phase adjusting operation will further be described with reference to FIG.4. Suppose that an input analog image signal 401 includes horizontal image starting pixels 402 and horizontal image terminating pixels 403. The image levels of the horizontal image starting pixels 402 and the horizontal image terminating pixels 403 in the clock phases can be recorded on the memory of the control circuit 107 by the operations in steps 302 to 304 and 306 and 309.

In step 311, the control circuit 107 carries out the following operations to adjust the clock signal to an optimum clock phase. First, the data on the image levels for the same phases are added up to obtain data on a combined image level represented by combined pixels 404. Second,data on a maximum combined image level is detected to detect a stable portion of the combined pixels 404. The image levels of the leading edge and the trailing edge of the image are low as compared with the image level of the stable portion. Therefore, the combined image levels corresponding to the clock phase of the stable portions of both the horizontal image starting pixels and the horizontal image terminating pixels are maximum.

A maximum detecting method adds up image levels corresponding to three successive clock phases to obtain a sum of the image levels. The middle clock phase among the three successive clock phases corresponding to a maximum sum of the image levels is an optimum clock phase. In an enlarged view 405 of combined pixels, the sum of the image levels respectively corresponding to clock phases m−1, m and m+1 is maximum and hence the clock phase m is the optimum clock phase.

The control circuit 107 controls the delay circuit 110 to adjust the phase of the clock signal to the optimum clock phase to complete the automatic clock phase adjustment.

Although this embodiment adds up the image levels corresponding to the three successive clock phases to determine the maximum value, the maximum value may be detected from individual image levels corresponding to the clock phases. The number of the image levels corresponding to the successive clock phases added up to determine the maximum value need not necessarily be three and may be any suitable number.

Figure 2:
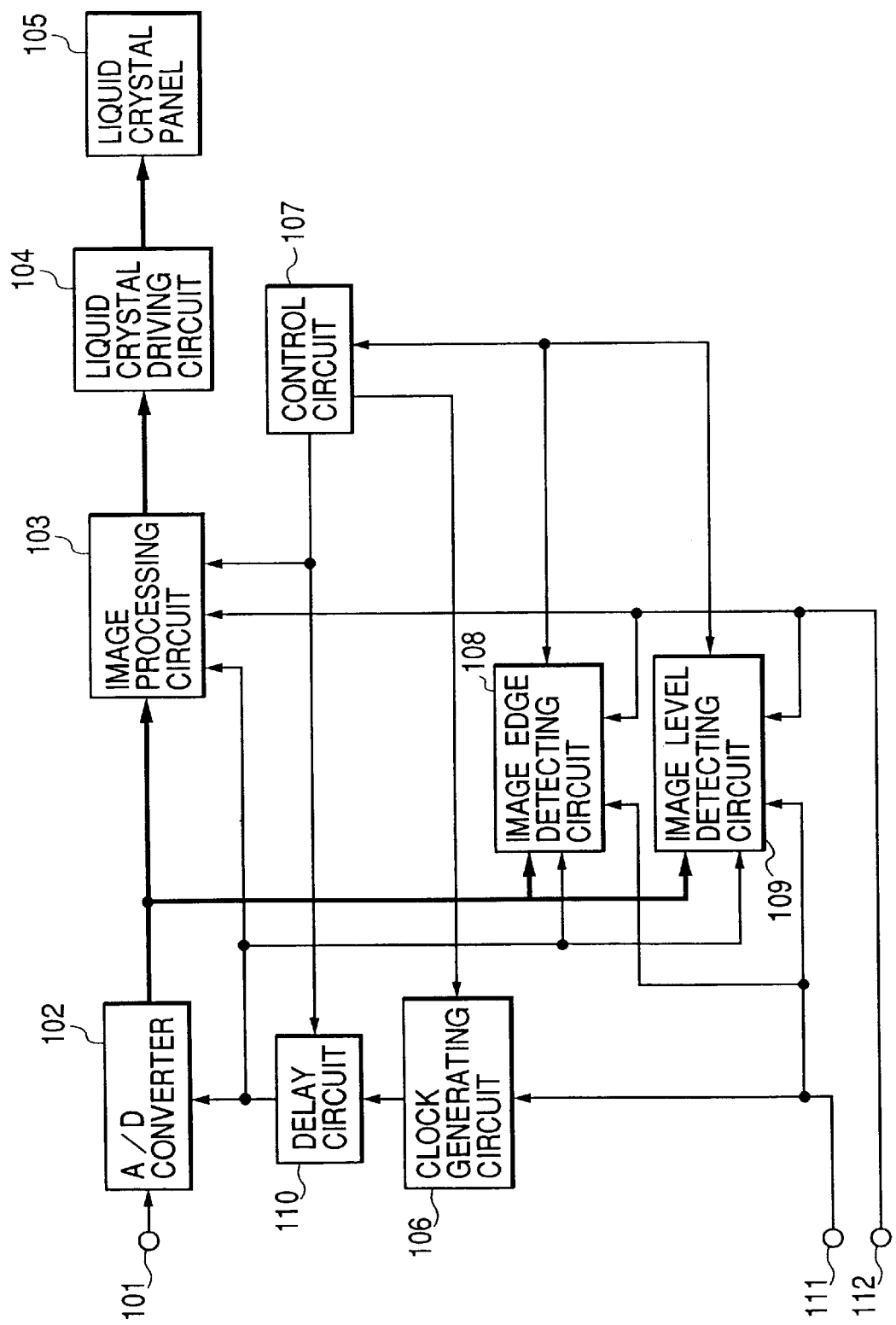
FIG. 2 is a block diagram of a liquid crystal display in a second embodiment according to the present invention.

FIG. 2 is a block diagram of a liquid crystal display in a second embodiment according to the present invention. This liquid crystal display displays pictures represented by analog image signals provided by a personal computer. Whereas the liquid crystal display in the first embodiment controls the clock phase by the delay by which the horizontal synchronizing signal given to the clock generating circuit 106, the liquid crystal display in the second embodiment gives a horizontal synchronizing signal directly to a clock generating circuit 106 and gives a clock signal provided by the clock generating circuit 106 to a delay circuit 110 to delay the clock signal for clock phase control.

The liquid crystal display in the second embodiment carries out the same automatic clock phase adjusting operation as that carried out by the liquid crystal display in the first embodiment.

Although the invention has been described as applied to the liquid crystal display employing the liquid crystal panel, it goes without saying that the present invention is applicable also to a fixed-pixel display device other than the liquid crystal display, such as a plasma panel which converts an analog image signal into a corresponding digital image signal and displays a picture represented by the digital image signal.

As is apparent from the foregoing description, according to the present invention, image levels at the horizontal image starting position and the horizontal image terminating position in clock phases are detected, and data on the image levels reflecting the leading edge and the trailing edge of the analog image signal can be obtained by combining the detected image levels. The clock phase in which the data on the image level is maximum, i.e., a stable portion in which the image level does not change significantly, is detected, and the phase of the clock signal is adjusted to that clock phase so that the clock signal conforms to the waveform of the input analog image signal to achieve an optimum automatic clock phase adjustment.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A clock phase adjusting device for adjusting phase of a clock signal for timing an operation for converting an analog image signal into a corresponding digital image signal, said clock phase adjusting device comprising:
   a delay circuit for delaying phase of the clock signal; and
   a control circuit connected to said delay circuit to control phase delay by which said delay circuit delays the phase of the clock signal;
   wherein said control circuit controls the phase delay so that the a maximum combined image level can be obtained by combining an image level of a horizontal image starting portion of the digital image signal, and an image level of a horizontal image terminating portion of the digital image signal.

2. A clock phase adjusting device for adjusting phase of a clock signal for timing an operation for converting an analog image signal into a corresponding digital image signal, said clock phase adjusting device comprising:
   a delay circuit for delaying phase of the clock signal; and
   a control circuit connected to said delay circuit to control phase delay by which said delay circuit delays the phase of the clock signal;
   wherein said control circuit controls the phase delay by which said delay circuit delays the phase of the clock signal, combines an image level of a horizontal image starting portion of the digital image signal, and an image level of a horizontal image terminating portion of the digital image signal to obtain a combined image level, and selects an optimum phase of the clock signal in which the combined image level is maximum to determine the phase delay.

3. An automatic clock phase adjusting device for adjusting phase of a clock signal for timing an operation for converting an analog image signal into a corresponding digital image signal, said clock phase adjusting device comprising:
   a delay circuit for delaying phase of the clock signal;
   an image level detecting circuit for detecting an image level of a horizontal image starting portion of the digital image signal, and an image level of a horizontal image terminating portion of the digital image signal; and
   a control circuit connected to said delay circuit and said image level detecting circuit to control phase delay by which said delay circuit delays the phase of the clock signal on the basis of an output signal provided by said image level detecting circuit;
   wherein said control circuit controls the phase delay by which said delay circuit delays the phase of the clock signal, combines an image level of a horizontal image starting portion of the digital image signal, and an image level of a horizontal image terminating portion of the digital image signal to obtain a combined image level by using the output signal of said image level detecting circuit, and selects an optimum phase of the clock signal in which the combined image level is maximum to determine the phase delay.

4. The automatic clock phase adjusting device according to claim 3, wherein the clock signal is generated by dividing frequency of a horizontal synchronizing signal given together with the analog image signal, and the delay circuit delays the phase of the clock signal by delaying the phase of the horizontal synchronizing signal.

5. The automatic clock phase adjusting device according to claim 3, wherein the clock signal is generated by dividing frequency of a horizontal synchronizing signal given together with the analog image signal, and said delay circuit delays the phase of the clock signal generated by dividing the frequency of the horizontal synchronizing signal.

6. The automatic clock phase adjusting device according to claim 3, wherein said control circuit adds up an image level of the horizontal image starting portion and that of the horizontal image terminating portion to obtain the combined image level.

7. A picture display comprising: a clock generating circuit that generates a clock signal; an A/D converter that receives an analog image signal, and converts the analog image signal into a corresponding digital image signal in synchronism with the clock signal; an image processing circuit that processes the digital image signal provided by said A/D converter; a display unit that displays a picture represented by an output signal provided by said image processing circuit; and an automatic clock phase adjusting device that adjusts phase of the clock signal generated by said clock generating circuit; said automatic clock phase adjusting device comprising:

a delay circuit that delays phase of the clock signal;

an image level detecting circuit that detects an image level of a horizontal image starting portion of the digital image signal, and an image level of a horizontal image terminating portion of the digital image signal; and a control circuit connected to said delay circuit and said image level detecting circuit to control phase delay by which said delay circuit delays the phase of the clock signal on the basis of an output signal provided by said image level detecting circuit;

wherein said control circuit controls the phase delay by which said delay circuit delays the phase of the clock signal, combines an image level of the horizontal image starting portion of the digital image signal, and an image level of the horizontal image terminating portion of the digital image signal to obtain a combined image level by using the output signal of said image level detecting circuit, and selects an optimum phase of the clock signal in which the combined image level is maximum to determine the phase delay.

8. The picture display according to claim 7, wherein said clock generating circuit receives a horizontal synchronizing signal together with the analog image signal, and generates the clock signal by dividing frequency of the horizontal synchronizing signal, and said delay circuit delays the phase of the clock signal by delaying the phase of the horizontal synchronizing signal.

9. The picture display according to claim 7, wherein the clock generating circuit generates the clock signal by dividing frequency of a horizontal synchronizing signal given together with the analog image signal, and said delay circuit delays the phase of the clock signal generated by said clock generating circuit.

10. An automatic clock phase adjusting device comprising:

an A/D converter that receives an analog image signal and a clock signal, and converts the analog image signal into a corresponding digital image signal in synchronism with the clock signal;

a delay circuit that delays the clock signal by an optional delay, and provides a delayed clock signal;

an image edge detecting circuit that receives the digital image signal provided by said A/D converter, a horizontal synchronizing signal provided by said delay circuit, a clock signal generated by a clock generating circuit, and a vertical synchronizing signal synchronous with the analog image signal, and detects horizontal image starting coordinates and horizontal image terminating coordinates;

an image level detecting circuit that receives signals the same as those received by said image edge detecting circuit, and detects digital signals indicating specified coordinates; and a control circuit that carries out operations including:

(a) a first control operation for sequentially delaying the phase of the clock signal generated by the clock generating circuit by changing the delay given to said delay circuit from a minimum value to a value exceeding one period of the clock signal in an optional step;

(b) a second control operation for obtaining digital signal values at the horizontal image starting coordinates and the horizontal image terminating coordinates detected by said image edge detecting circuit by said image level detecting circuit in each clock phase specified by the first control operation;

(c) an arithmetic operation for adding up the digital signal values of the horizontal image starting coordinates and the horizontal image terminating coordinates in each clock phase obtained by the second control operation;

(d) a detecting operation for detecting a clock phase corresponding to a maximum added digital signal value among the added digital signal values calculated by the arithmetic operation; and (e) a third control operation for controlling the delay circuit so that said clock signal has a clock phase detected by the detecting operation.

11. An automatic clock phase adjusting device according to claim 10, wherein the clock signal is obtained by dividing frequency of a horizontal synchronizing signal given together with the analog image signal, and said delay circuit delays the phase of the clock signal by delaying phase of the horizontal synchronizing signal.

12. A picture display provided with the automatic clock phase adjusting device according to claim 10.

13. A clock phase adjusting device for adjusting phase of a clock signal for timing the conversion of an analog image signal into a corresponding digital image signal, said clock phase adjusting device comprising:

a delay means for delaying phase of the clock signal; and a control means for controlling phase delay by which said delay means delays the phase of the clock signal;

wherein said control means controls the phase delay so that the a maximum combined image level can be obtained by combining an image level of a horizontal image starting portion of the digital image signal, and an image level of a horizontal image terminating portion of the digital image signal.

14. A clock phase adjusting device for adjusting phase of a clock signal for timing the conversion of an analog image signal into a corresponding digital image signal, said clock phase adjusting device comprising:

a delay mans for delaying phase of the clock signal; and a control means for controlling phase delay by which said delay means delays the phase of the clock signal;

wherein said control means controls the phase delay by which said delay circuit delays the phase of the clock signal, combines an image level of a horizontal image starting portion of the digital image signal, and an image level of a horizontal image terminating portion of the digital image signal to obtain a combined image level, and selects an optimum phase of the clock signal in which the combined image level is maximum to determine the phase delay.

15. An automatic clock phase adjusting device for adjusting phase of a clock signal for timing an operation for converting an analog image signal into a corresponding digital image signal, said clock phase adjusting device comprising:

a delay means for delaying phase of the clock signal;

an image level detecting means for detecting an image level of a horizontal image starting portion of the digital image signal, and an image level of a horizontal image terminating portion of the digital image signal; and a control means for controlling phase delay by which said delay means delays the phase of the clock signal on the basis of an output signal provided by said image level detecting means;

wherein said control means controls the phase delay by which said delay means delays the phase of the clock signal, combines an image level of a horizontal image starting portion of the digital image signal, and an image level of a horizontal image terminating portion of the digital image signal to obtain a combined image level by using the output signal of said image level detecting means, and selects an optimum phase of the clock signal in which the combined image level is maximum to determine the phase delay.

16. The automatic clock phase adjusting device according to claim 15, wherein the clock signal is generated by dividing frequency of a horizontal synchronizing signal given together with the analog image signal, and said delay means delays the phase of the clock signal by delaying the phase of the horizontal synchronizing signal.

17. The automatic clock phase adjusting device according to claim 15, wherein the clock signal is generated by dividing frequency of a horizontal synchronizing signal given together with the analog image signal, and said delay means delays the phase of the clock signal generated by dividing the frequency of the horizontal synchronizing signal.

18. The automatic clock phase adjusting device according to claim 15, wherein said control means adds up an image level of the horizontal image starting portion and that of the horizontal image terminating portion to obtain the combined image level.

19. A picture display comprising: a clock generating means that generates a clock signal; an A/D conversion means that receives an analog image signal, and converts the analog image signal into a corresponding digital image signal in synchronism with the clock signal; an image processing means that processes the digital image signal provided by said A/D conversion means; a display means that displays a picture represented by an output signal provided by said image processing means; and an automatic clock phase adjusting means that adjusts the phase of the clock signal generated by the clock generating circuit; said automatic clock phase adjusting means comprising:

a delay means that delays phase of the clock signal;

an image level detecting means that detects an image level of a horizontal image starting portion of the digital image signal, and an image level of a horizontal image terminating portion of the digital image signal; and a control means that controls phase delay by which said delay means delays the phase of the clock signal on the basis of an output signal provided by said image level detecting means;

wherein said control means controls the phase delay by which said delay means delays the phase of the clock signal, combines an image level of the horizontal image starting portion of the digital image signal, and an image level of the horizontal image terminating portion of the digital image signal to obtain a combined image level by using the output signal of said image level detecting circuit, and selects an optimum phase of the clock signal in which the combined image level is maximum to determine the phase delay.

20. The picture display according to claim 19, wherein said clock generating means receives a horizontal synchronizing signal together with the analog image signal, and generates the clock signal by dividing frequency of the horizontal synchronizing signal, and said delay means delays the phase of the clock signal by delaying the phase of the horizontal synchronizing signal.

21. The picture display according to claim 19, wherein the clock generating means receives a horizontal synchronizing signal together with the analog image signal and generates the clock signal by dividing frequency of the horizontal synchronizing signal, and said delay means delays the phase of the clock signal generated by said clock generating means.

* * * * *